United States Patent [19]
Mros et al.

[11] Patent Number: 6,032,209
[45] Date of Patent: Feb. 29, 2000

[54] HOT-SWAPPABLE HIGH SPEED POINT-TO-POINT INTERFACE

[75] Inventors: Stanley P. Mros, Roseville; Kevin J. Jenkins, Elk River, both of Minn.

[73] Assignee: Storage Technology Corporation, Louisville, Colo.

[21] Appl. No.: 09/122,540

[22] Filed: Jul. 24, 1998

[51] Int. Cl.$^7$ ............................ G06F 13/00; G06F 13/14; H02J 1/16; H03K 17/16
[52] U.S. Cl. .......................... 710/103; 710/106; 326/21; 326/90; 307/471
[58] Field of Search ................................. 710/101–106; 307/471; 326/21, 90

[56] References Cited

U.S. PATENT DOCUMENTS

| | | |
|---|---|---|
| 4,736,124 | 4/1988 | McFarland, Jr. . |
| 5,220,211 | 6/1993 | Christopher et al. ...................... 326/90 |
| 5,455,917 | 10/1995 | Holeman et al. . |
| 5,530,302 | 6/1996 | Hamre et al. . |
| 5,761,463 | 6/1998 | Allen ....................................... 710/129 |

OTHER PUBLICATIONS

Application Note entitled: "Designing with PECL (ECL at +5 0V)", by Cleon Petty and Todd Pearson, AB1406 Application Note, Motorola, Inc., 1996, pp. 5–60 to 5–68.

"Electronic Packaging of High Speed Circuitry", by Stephen G. Konsowski and Arden R. Helland, book published by McGraw–Hill, 1997, pp. 14–17.

*Primary Examiner*—Ayaz R. Sheikh
*Assistant Examiner*—Sumati Lefkowitz
*Attorney, Agent, or Firm*—Brooks & Kushman

[57] ABSTRACT

A hot-swappable, point-to-point connection between a high speed transmitter on a transmitter card and a high speed receiver on a receiver card is provided. The transmitter card and the receiver card can be inserted into a backplane, the backplane forming the connection between the transmitter and the receiver. The system includes a power indicator on the transmitter card and the receiver card, with each power indicator asserting a power signal to respective switch control inputs on the transmitter and receiver cards when the respective cards are inserted into the backplane. The assertion or unassertion of a power signal to the control inputs allows for the disabling of the receiver when the transmitter is not connected to the backplane and the disabling of the transmitter when the receiver is not connected to the backplane, thereby preventing transmitter output EMI and ringing and receiver input oscillation.

15 Claims, 4 Drawing Sheets

HOT-SWAPPABLE HIGH SPEED POINT-TO-POINT INTERFACE

TECHNICAL FIELD

The present invention relates to a hot-swappable point-to-point interface for use in a high speed, differential, serial backplane.

BACKGROUND ART

With the advent of low cost Fibre Channel and Gigabit Ethernet transceivers, a communication or computer architecture using a low cost, high speed, serial backplane becomes increasingly feasible. These high speed transceivers, which are normally used to connect computers and other devices in networking applications, are well suited for application in a serial backplane. One advantage is a communication rate of 1 gigabit per second. A second advantage is operation using a single positive voltage power supply.

In a typical networking application of these transceivers, differential outputs of a transmitter are AC coupled to a differential transmission line. The transmission line is routed to a differential receiver. Termination and DC bias circuitry connected to the receiver input may include differential and common mode components, reducing reflections present on the transmission line and preventing conversion of differential mode propagation to common mode and vice-versa. The biasing structure further restores the DC portion of the signal that was lost through AC coupling, setting the incoming signal to a level appropriate for the receiver.

In a typical networking system, transmitters and receivers may be located on separate printed circuit cards. These cards are inserted into a backplane which provides electrical connectivity between the cards. For many reasons, including maintenance, reconfiguration, upgrades, and the like, it is desirable to remove cards from and insert cards in the backplane without removing power from the remainder of the system. The addition or removal of a card from a system without removing power is known as hot-swapping or live insertion.

As cards are hot-swapped, a transmitter may be connected to a transmission line with no terminator. This creates a source of electromagnetic interference (EMI). Because of the high speed edges generated by the drivers, this may also create a high-Q resonator that can damage the transmitter. Hot-swapping may also create a situation in which a receiver is not connected to a transmitter. This creates a differential input with a DC bias but no AC signal. For certain types of receivers such as crosspoint switches or a positive supply emitter-coupled logic (PECL) buffer, the input may oscillate or behave poorly.

What is needed is a system that enables cards used in a high speed point-to-point differential backplane to be hot-swapped. The cards should operate from only positive voltage supplies and should maintain proper signal termination. Various high speed logic families should be supported. Transmitter output EMI and ringing as well as receiver input oscillation created by removing a corresponding device should be eliminated.

SUMMARY OF THE INVENTION

It is an object of the present invention to provide a point-to-point serial backplane interconnect that enables cards to be hot-swapped.

Another object of the present invention is to provide hot-swappability of cards using only positive power supplies.

Still another object of the present invention is to provide hot-swappability of cards while maintaining proper signal termination.

Yet another object of the present invention is to provide hot-swappability between elements of high speed, differential balanced logic families.

A further object of the present invention is to provide hot-swappability between transmitters and receivers used to create point-to-point serial bus connections.

A still further object of the present invention is to prevent EMI and resonance from a transmitter left unterminated because a corresponding receiver has been removed.

Yet a further object of the present invention is to prevent oscillation on the input of a receiver left disconnected by removal of a corresponding transmitter.

Yet a still further object of the present invention is to interface various differential logic families available now and in the future.

In carrying out the above objects and other objects and features of the present invention, a system for a hot-swappable point-to-point connection between a high speed transmitter on a first card and a high speed receiver on a second card is provided. The transmitter is disabled if the transmitter output is not connected to a fixed voltage through resistive elements. The receiver is disabled if the receiver input is not biased to a preset voltage. The first card and the second card can be inserted into a backplane, the backplane forming the connection between the transmitter and the receiver. The system includes a power indicator on the first card connected to the backplane when the first card is inserted in the backplane, the power indicator operable to assert a power signal when power is applied to the first card. A switch on the second card is connected to a bias network, the bias network providing a bias voltage to the input of the receiver. The switch has a control input connected to the backplane when the second card is inserted in the backplane. The switch enables the receiver when the control input is asserted and disables the receiver when the control input is unasserted by changing the bias voltage of the bias network. A connection through the backplane forms a path connecting the power indicator to the control input when the first card and the second card are inserted in the backplane. Therefore, the control input is unasserted if the second card is inserted in the backplane and the first card is not inserted in the backplane, disabling the receiver when the transmitter is not connected to the receiver. Likewise, a second power indicator on the second card is connected to the backplane when the second card is inserted in the backplane. A switch on the first card connects the transmitter output to a fixed voltage through at least one resistive element. The switch has a control input connected to the backplane when the first card is inserted in the backplane. The switch enables the transmitter when the control input is asserted and disables the transmitter when the control input is unasserted. Another connection through the backplane forms a path connecting the power indicator to the control input when the first card and the second card are inserted in the backplane. Therefore, the control input is unasserted if the first card is inserted in the backplane and the second card is not inserted in the backplane, disabling the transmitter when the transmitter is not connected to the receiver.

In one embodiment of the present invention, each power indicator may be a connection to a power bus on the card containing the power indicator. In an alternate embodiment, each power indicator may be a power-on reset generator operable to assert the corresponding power signal a preset time after power is applied to the card containing the power indicator.

A transmitter card is provided that includes a switch. The first end of the switch is connected to a fixed voltage. The control input of the switch is connected to the backplane when the transmitter card is inserted in the backplane. The switch closes when an asserted power signal is applied to the control input and is open otherwise. The transmitter card also includes at least one resistive element having a first end connected to the second end of the switch. A transmitter with an output is further included. The output is connected to the backplane when the transmitter card is inserted in the backplane. The output is further connected to the second end of the at least one resistive element. The transmitter is enabled if a path exists from the transmitter output to the fixed voltage through the at least one resistive element and is disabled otherwise. The transmitter card, backplane, and receiver card form a path between the transmitter and the receiver and a path between the power indicator and the control input when the transmitter card and the receiver card are inserted in the backplane. Thereby, if the transmitter card is in the backplane, the transmitter is disabled if the path between the transmitter and the receiver is broken by hot-swapping the receiver card out of the backplane and enabled if the path between the transmitter and the receiver is formed by hot-swapping the receiver card into the backplane.

In one embodiment, the transmitter output and the receiver input are a differential pair and the at least one resistive element is a first resistor connected between the first connection of the differential pair and the second end of the switch and a second resistor connected between the second connection of the differential pair and the second end of the switch.

In another embodiment, the transmitter is a positive power supply emitter-coupled logic (PECL) driver and the fixed voltage is ground.

In still another embodiment, the transmitter card includes a plurality of transmitters, each transmitter connected through at least one resistive element to the switch.

In yet another embodiment, the switch is a field effect transistor (FET) having a source, a drain and a gate, the path between the at least one resistive element and the fixed voltage passing through the source and the drain, and the gate providing the switch control input.

A receiver card is also provided. The receiver card includes a receiver with a differential input connected to the backplane when the receiver card is inserted in the backplane. The receiver is disabled when the DC level on the differential input is below a threshold and is enabled otherwise. A termination network is connected to the differential input. A switched biasing network is connected to the termination network. The switched biasing network has a control input connected to the backplane when the receiver card is inserted in the backplane. The switched biasing network biases the differential input above the threshold when an asserted power signal is applied to the control input and biases the differential input below the threshold otherwise. The transmitter card, backplane, and receiver card form a differential path between the transmitter and the receiver and form a path between the power indicator and the control input when the transmitter card and the receiver card are inserted in the backplane. Thereby, if the receiver card is in the backplane, the receiver is disabled if the path between the transmitter and the receiver is broken by hot-swapping the transmitter card out of the backplane and the receiver is enabled if the path between the transmitter and the receiver is formed by hot-swapping the transmitter card into the backplane.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
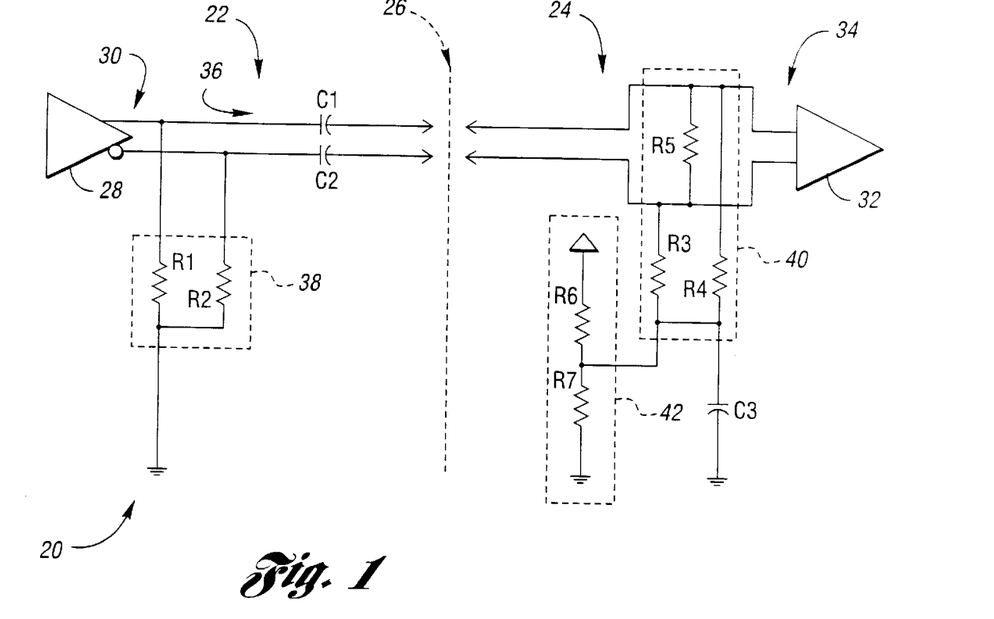
FIG. 1 is a schematic diagram of a previous interconnect scheme for a PECL transmitter and receiver pair.

Referring now to FIG. 1, a schematic diagram of a previous interconnect scheme for a PECL transmitter and receiver pair is shown. Connection system 20 includes at least one transmitter card, one of which is shown generally by 22, connected to at least one receiver card, one of which is shown generally by 24, through a backplane, shown generally by 26.

Transmitter card 22 includes transmitter 28 having transmitter output 30. Receiver card 24 includes receiver 32 having receiver input 34. When transmitter card 22 and receiver card 24 are inserted in backplane 26, a data connection, shown generally by 36, is formed between transmitter output 30 and receiver input 34. In a preferred embodiment, a card may include more than one of transmitter 28 or receiver 32, and may contain both transmitter 28 and receiver 32. A single transmitter-receiver pair is shown for simplicity and ease of illustration.

In a preferred embodiment, transmitter 28 is a positive power supply emitter-coupled logic (PECL) driver, such as can be found in the ECLiPS family developed by Motorola. Other types of logic are possible such as gates produced using the GaAs process developed by Triquint, Inc.

PECL driver transmitter 28 produces differential transmitter output 30. Since the output drivers of transmitter 28 are unloaded emitter followers, resistive elements 38 to a fixed voltage must be supplied. For PECL transmitter 28, resistors R1 and R2 from transmitter output 30 to ground are used. Transmitter 30 operates in a manner such that, if the path from transmitter output 30 through resistive elements 38 to the fixed voltage is interrupted, transmitter 28 will not generate an output signal. PECL transmitter output 30 has DC blocking capacitors C1 and C2 so that a signal from transmitter 28 has a zero volt DC average.

Since transmitter 28 is capable of sending high speed data, data connection 36 must be treated as transmission lines. Termination network 40 connected to receiver input 34 reduces reflections on data connection 36 by matching the characteristic impedance of data connection 36. In the embodiment shown, termination network 40 includes resistors R3 and R4 for common-mode termination and the combination of R3, R4, and R5 for differential-mode termination.

In a preferred embodiment, receiver 32 is chosen from a family that has clamped receiver input 34 such as, for example, the Motorola ECLiPS family. For this family, if the DC value at receiver input 34 is below a threshold, receiver 32 is disabled. Bias network 42, connected to termination network 40, sets receiver input 34 to a nonzero average value, enabling receiver 32. In the embodiment shown, bias network 42 is implemented through a voltage divider between R6 and R7. Capacitor C3 provides a high frequency path to ground while allowing bias network 42 to bias termination network 40.

If receiver card 24 is hot-swapped out of backplane 26 while transmitter card 22 is in backplane 26, transmitter output 30 is connected to data path 36 without termination network 40. This creates a source of electromagnetic interference (EMI). Because of the high speed edges generated by transmitter output 30, this may also create a high-Q resonator that can damage transmitter 28. If transmitter card 22 is hot-swapped out of backplane 26 while receiver card 24 is in backplane 26, receiver 32 has open inputs. This creates a differential input with a DC bias but no AC signal. For certain types of receivers such as crosspoint switches or a positive supply emitter-coupled logic (PECL) buffer, the input may oscillate or behave poorly.

Figure 2:
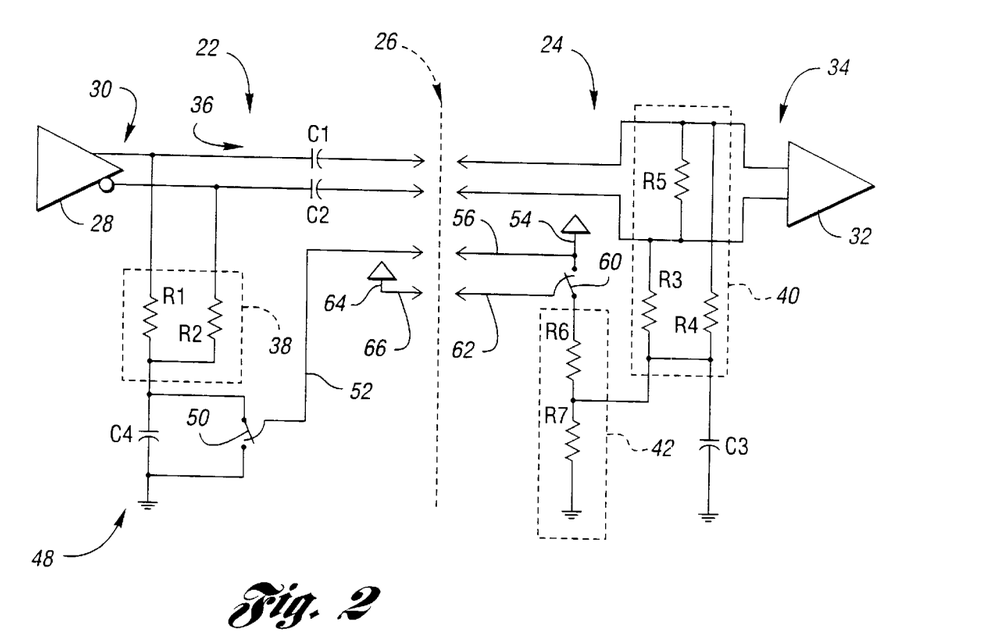
FIG. 2 is a schematic diagram of an interconnect scheme between a PECL transmitter and a PECL receiver according to the present invention.

Referring now to FIG. 2, a schematic diagram of an interconnect scheme between a PECL transmitter and a PECL receiver according to the present invention is shown. Each card in connection system 48 detects the presence of a corresponding card by sensing the power supply and disables communication elements if the corresponding card is not detected.

First switch 50 is connected to transmitter 28 between resistive elements 38 and the fixed voltage level. First switch 50 has first control input 52 which is connected to backplane 26 when transmitter card 22 is inserted in backplane 26. If first control input 52 is asserted, first switch 50 is closed, connecting resistive elements 38 to the ground and thereby enabling transmitter 28.

Power indicator 54 on receiver card 24 is connected to backplane 26 when receiver card 24 is inserted in backplane 26. Power indicator 54 asserts a signal on power output 56 when power is applied to receiver card 24. In the embodiment shown, power indicator 54 is a connection to a power bus on receiver card 24. An alternative embodiment is described with regards to FIG. 4 below.

When transmitter card 22 and receiver card 24 are inserted in backplane 26, backplane 26 forms a connection between power indicator output 56 and control input 52. If power is supplied to receiver card 24, switch 50 will be closed and transmitter 28 enabled. If receiver card 24 is hot-swapped out of backplane 26, switch 50 opens, breaking the path from the fixed voltage through resistive elements 38 to transmitter output 30, disabling transmitter 28. This prevents transmitter 28 from transmitting down connection 36 which is not properly terminated. If receiver card is subsequently hot-swapped into backplane 26, switch 50 will close and transmitter 28 will be reenabled.

Second switch 60 is located on receiver card 24. Second switch 60 is connected to bias network 42 such that, if second switch 60 is closed, bias network 42 provides to receiver input 34 a bias voltage greater than the threshold required to enable receiver 32. If second switch 60 is open, receiver input 34 is biased below the threshold necessary to enable receiver 32. Second switch 60 has second control input 62 which is connected to backplane 26 when receiver card 24 is inserted in backplane 26. If second control input 62 is asserted, second switch 60 is closed, causing bias network 42 to provide receiver input 34 with sufficient bias voltage to enable receiver 32. Second switch 60 and bias network 42 form a switched biasing network.

Power indicator 64 on transmitter card 22 is connected to backplane 26 when transmitter card 22 is inserted in backplane 26. Power indicator 64 asserts a signal on power output 66 when power is applied to transmitter card 22. In the embodiment shown, power indicator 64 is a connection to a power bus on transmitter card 22. An alternative embodiment is described with regards to FIG. 4 below.

In a preferred embodiment, a resistor is connected between power indicator output 56 and Vcc to form power indicator 54 and another resistor is connected between power indicator output 66 and Vcc to form power indicator 64. Each resistor limits current in the event of a short. Such a short may occur, for example, if a pin connecting power indicator output 56,66 is bent. Such a short could destroy the pin, other components, traces on cards 22,24, or collapse power to system 20.

When transmitter card 22 and receiver card 24 are inserted in backplane 26, backplane 26 forms a connection between power indicator output 66 and control input 62. If power is supplied to transmitter card 22, switch 60 will be closed thereby enabling receiver 32. If transmitter card 22 is hot-swapped out of backplane 26, switch 60 opens, breaking the connection between biasing network 42 and the positive power supply, grounding termination network 40, thereby causing receiver 32 to become disabled. If transmitter card 22 is subsequently hot-swapped into backplane 26, switch 60 will close and receiver 32 will be reenabled.

Figure 3:
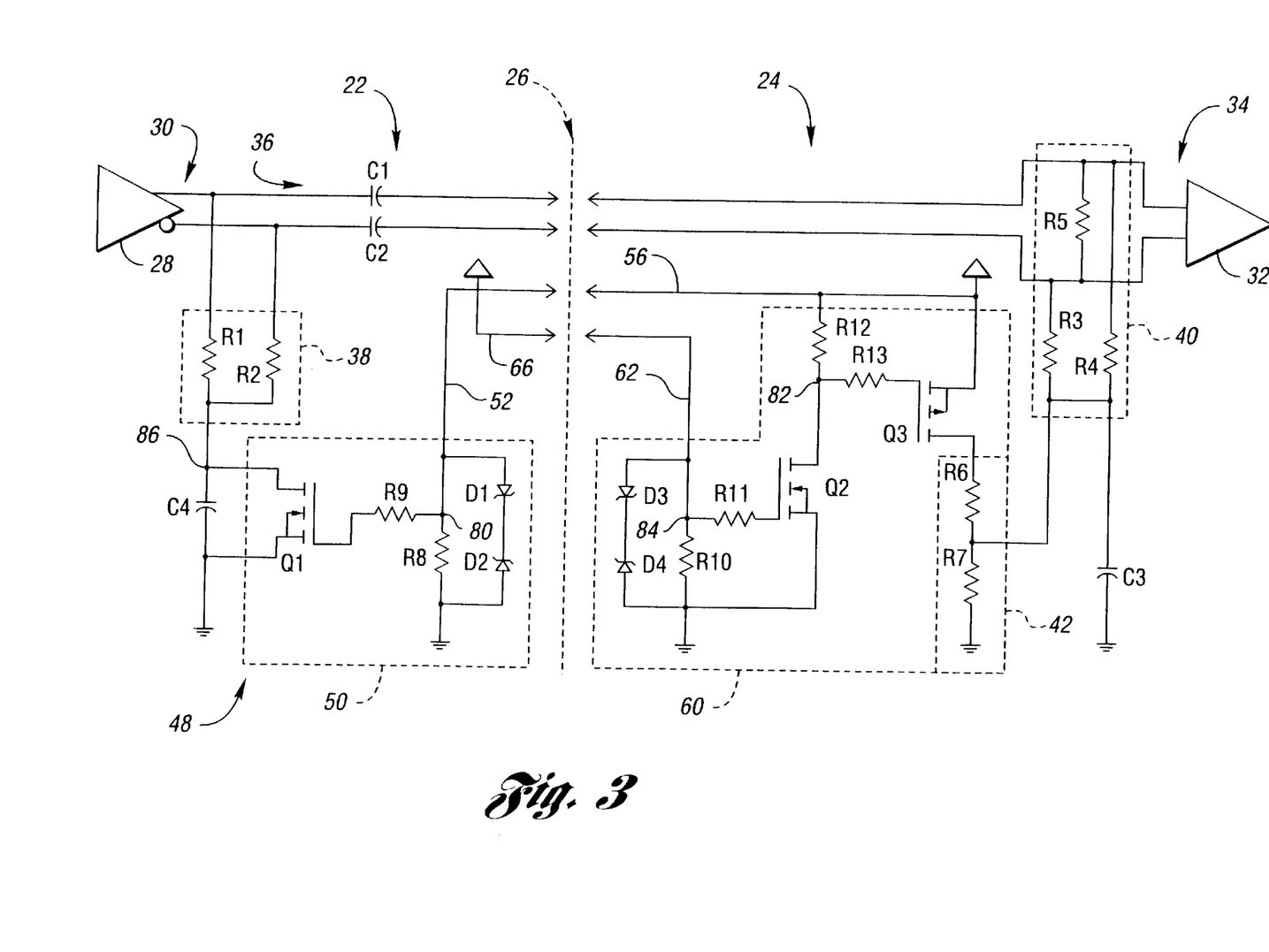
FIG. 3 is a schematic diagram of an illustrative implementation of switches shown in FIG. 2.

Referring now to FIG. 3, a schematic diagram of an illustrative implementation of switches used in the present invention is shown.

First switch 50 uses n-channel MOSFET Q1 to provide a path from transmitter output 30 through resistive elements 38 to ground. The drain of MOSFET Q1 is connected to the side of resistors R1 and R2 not connected to transmitter output 30. The source of MOSFET Q1 is connected to ground. The gate of MOSFET Q1 is connected through resistor R9 to first control input 52 at node 80. Resistor R8 connects node 80 to ground. Zener diodes D1 and D2 are connected in series in opposing forward conducting directions across resistor R8.

When transmitter board 22 and receiver board 24 are both in backplane 26, first control input 52 is connected to Vcc (+5 volts typically) through power indicator output 56. This causes Vcc to appear across resistor R8 and, hence, at the gate of MOSFET Q1, turning Q1 on. When MOSFET Q1 is on, transmitter output 30 is connected to ground through resistors R1 and R2, enabling transmitter 28. If the connection between first control input 52 and receiver card 24 is broken, Vcc no longer appears across R8, MOSFET Q1 is off, and transmitter 28 is disabled.

Resistor R9 and zener diodes D1 and D2 provide protection against electrostatic discharge that may be seen on first control input 52.

Second switch 60 is implemented with n-channel MOSFET Q2 and p-channel MOSFET Q3. The drain of MOSFET Q2 is connected at node 82 to resistor R12 and, therethrough, to Vcc. The source of MOSFET Q2 is connected to ground. The gate of MOSFET Q2 is connected through resistor R11 to second control input 62 at node 84. Resistor R10 connects node 84 to ground. Zener diodes D3 and D4 are connected in series in opposing forward conducting directions across resistor R10. Resistor R13 connects node 82 to the gate of MOSFET Q3. The source of MOSFET Q3 is connected to Vcc and the drain to resistor R6 of bias network 42.

The operation of MOSFET Q2, resistors R10 and R11, and diodes D3 and D4 mirror the corresponding elements MOSFET Q1, resistors R8 and R9, and diodes D1 and D2 in first switch 50. In particular, when transmitter board 22 and receiver board 24 are inserted in backplane 26, second control input 62 is connected to power indicator output 66, causing MOSFET Q2 to be on. Otherwise, MOSFET Q2 is off.

When MOSFET Q2 is off, the gate of MOSFET Q3 is at VCC due to the path through resistors R12 and R13. Hence, MOSFET Q3 is off and the output of bias network 42 is 0 volts, disabling receiver 32. When MOSFET Q2 is on, the gate of MOSFET Q3 is grounded, turning MOSFET Q3 on. Resistor R6 is then connected to Vcc, causing bias network 42 to output a voltage above the threshold required to enable receiver 32. Resistor R13 reduces the speed at which MOSFET Q3 turns on and off.

Figure 4:
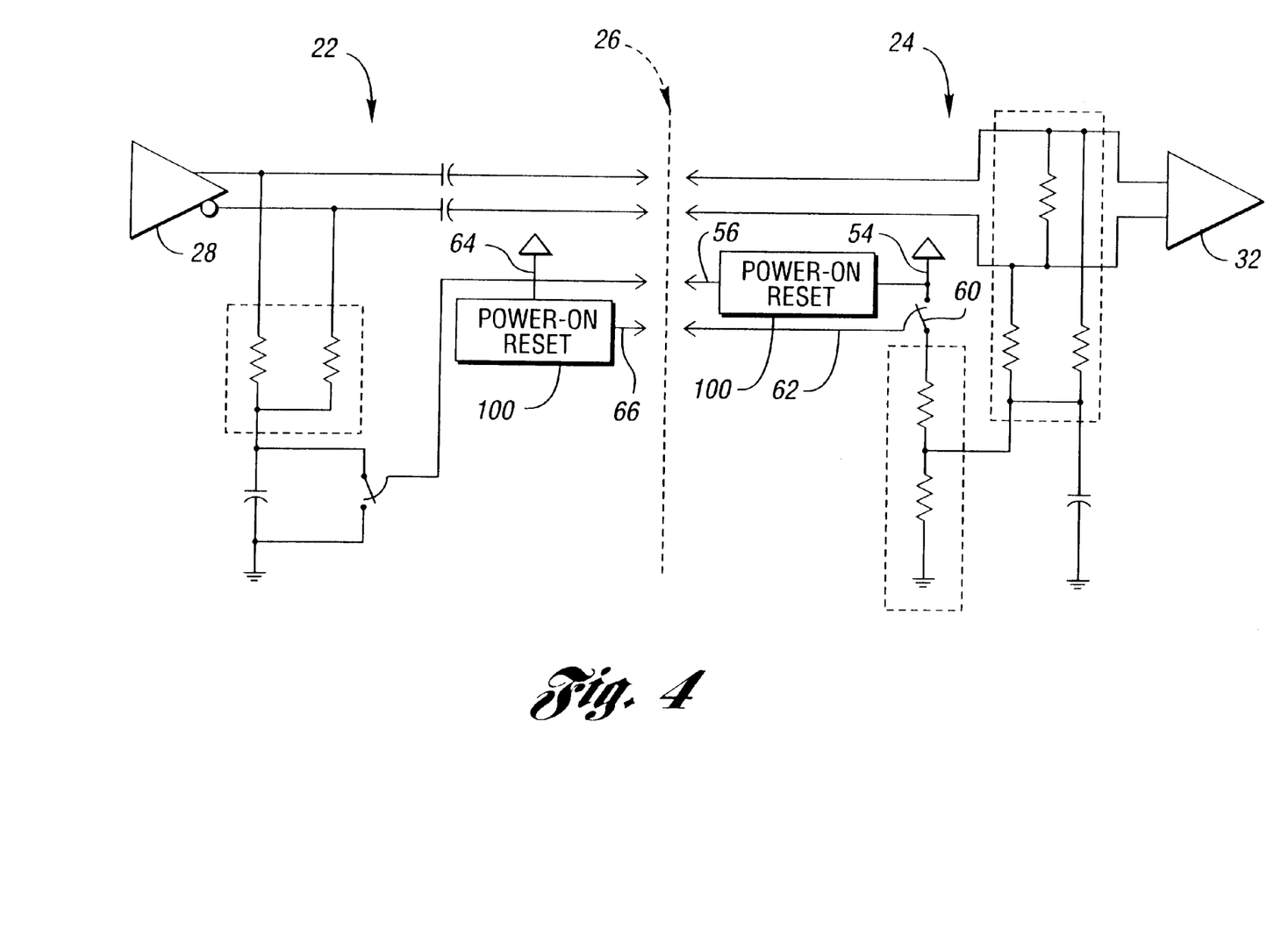
FIG. 4 is a schematic diagram of an alternative embodiment showing the use of power-on reset generators for developing power signals.

Referring now to FIG. 4, a schematic diagram of an alternative embodiment showing the use of power-on reset generators for developing power signals is shown. On either or both of transmitter card 22 and receiver card 24, power indicator 54,64 may be power-on reset generator 100. Power-on reset generator 100 is operable to assert a power signal on power indicator output 56,66 a preset time after power is applied to card 22,24 containing power-on reset generator 100. Power-on reset generator 100 may be implemented with a simple resistor and capacitor, with an electronic delay circuit, or the like.

Figure 5:
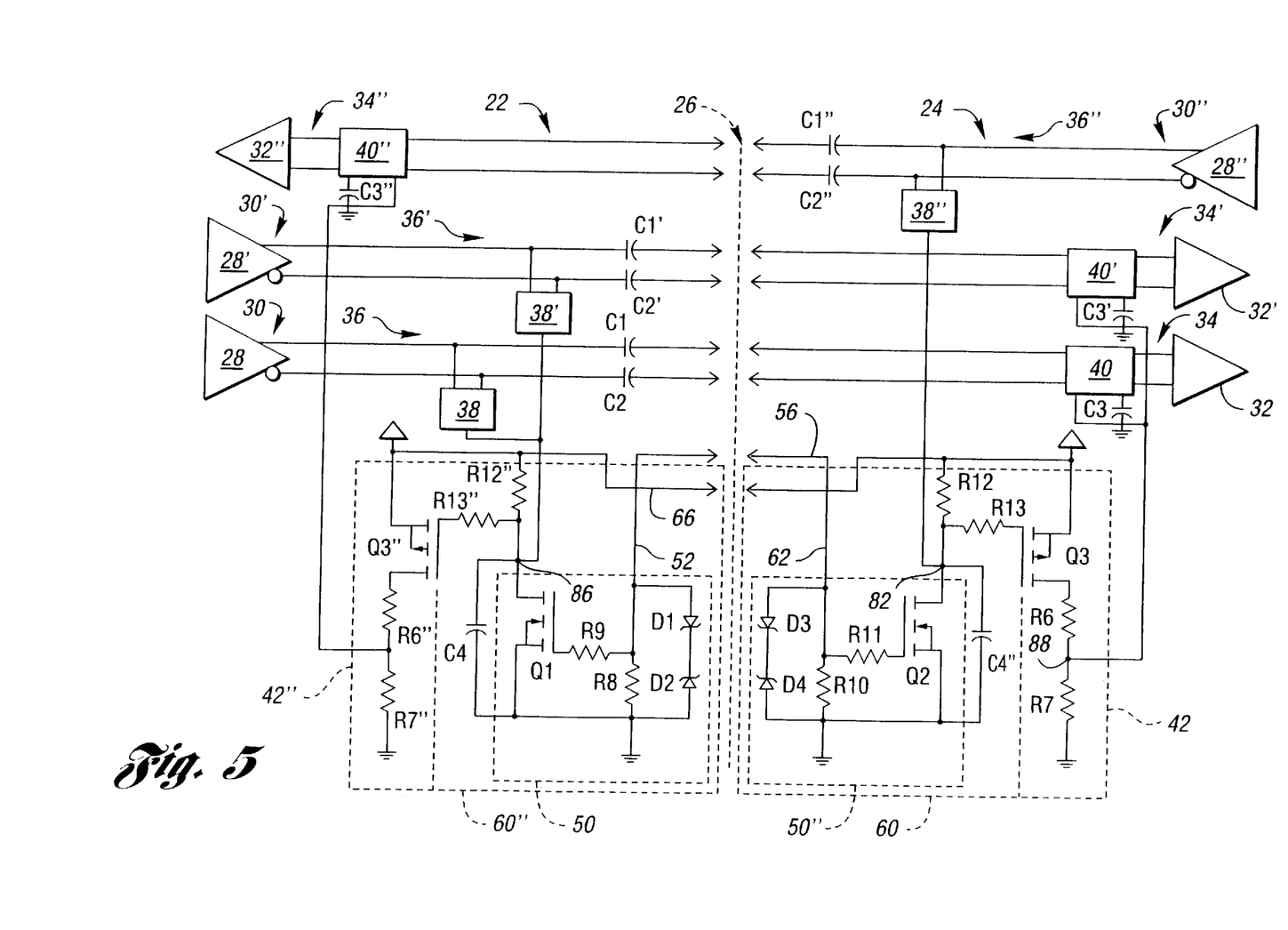
FIG. 5 is a schematic diagram of alternative embodiments of the present invention supporting multiple transmitters or receivers and for both transmitters and receivers on a card.

Referring now to FIG. 5, embodiments of the present invention for multiple transmitters or receivers and for both transmitters and receivers on a card are shown.

In one embodiment of the present invention, multiple transmitters 28 and 28' on transmitter card 22 may transmit to corresponding receivers 32 and 32' on receiver card 24. Each transmitter output 30,30' will have an associated set of resistive elements 38,38', all of which are connected to first switch 50 at node 86. Likewise, each transmitter output 30,30' will have an associated termination network 40,40', each of which is connected to bias network 42 at node 88 controlled by second switch 60. Although two transmitters 28,28' are shown, any number may be added providing transistor Q1 can sink the required current. A corresponding number of receivers 32,32' are added to receiver card 24.

In another embodiment, transmitter card 22 and receiver card 24 both have at least one transmitter 28,28" and at least one receiver 32,32", each transmitter 28,28" on one card in correspondence with receiver 32,32" on the other card. To accommodate transmitter 28", node 82 on receiver card 24 may be connected to resistive elements 38" on receiver card 24. Transistor Q2, capacitor C4", resistors R10, R11, and R12, and diodes D3 and D4 implement switch 50 on receiver card 24. Capacitors C1" and C2" on receiver card 24 block DC for transmitter 28" in the same manner as corresponding components (without double primes) on transmitter card 22.

To accommodate receiver 32", transistor Q3" and resistors R6", R7", R12", and R 13" are connected to node 86 on transmitter card 22 in exactly the same configuration as the corresponding components (without double primes) are connected to node 82 on receiver card 24. Termination network 40" and capacitor C3" on transmitter card 22 are connected in the same configuration and perform the same functions as the corresponding components (without double primes) on receiver card 24. In this manner, minimal additional circuitry is required for bidirectional communication between transmitter card 22 and receiver card 24. Although one transmitter 28,28" and one corresponding receiver 32,32" are shown on each card, any number of transmitters 28,28',28" and receivers 32,32',32" may be implemented on transmitter card 22 or receiver card 24.

While the best modes for carrying out the invention have been described in detail, other possibilities exist within the spirit and scope of the present invention. For example, a point-to-point connector set may be used in place of the backplane. Those familiar with the art to which this invention relates will recognize various alternative designs and embodiments for practicing the invention as defined by the following claims.

What is claimed is:

1. A system for a hot-swappable point-to-point connection between a high speed transmitter on a first card and a high speed receiver on a second card, the transmitter being disabled if the transmitter output is not connected to a fixed voltage through resistive elements, the receiver disabled if the receiver input is not biased to a preset voltage, the first card and the second card insertable into a backplane, the backplane forming the connection between the transmitter and the receiver, the system comprising:

a first power indicator on the first card connected to the backplane when the first card is inserted in the backplane, the power indicator operable to assert a first power signal when power is applied to the first card;

a second power indicator on the second card connected to the backplane when the second card is inserted in the backplane, the power indicator operable to assert a second power signal when power is applied to the second card;

a first switch on the first card connecting the transmitter output to a fixed voltage through at least one resistive element, the first switch having a first control input connected to the backplane when the first card is inserted in the backplane, the first switch operable to enable the transmitter when the first control input is asserted and to disable the transmitter when the first control input is unasserted;

a second switch on the second card connected to a bias network, the bias network providing a bias voltage to the input of the receiver, the second switch having a second control input connected to the backplane when the second card is inserted in the backplane, the second switch operable to enable the receiver when the second control input is asserted and to disable the receiver when the second control input is unasserted by changing the output voltage of the bias network;

a first connection through the backplane forming a first path between the first card and the second card, the first path connecting the first power indicator to the second control input when the first card and the second card are inserted in the backplane; and a second connection through the backplane forming a second path between the first card and the second card, the second path connecting the second power indicator to the first control input when the first card and the second card are inserted in the backplane;

wherein the first control input is unasserted if the first card is inserted in the backplane and the second card is not inserted in the backplane, thereby disabling the transmitter when the transmitter is not connected to the receiver; and wherein the second control input is unasserted if the second card is inserted in the backplane and the first card is not inserted in the backplane, thereby disabling the receiver when the transmitter is not connected to the receiver.

2. A system for a hot-swappable point-to-point connection as in claim 1 wherein the first power indicator is a connection to a power bus on the first card and the second power indicator is a connection to a power bus of the second card.

3. A system for a hot-swappable point-to-point connection as in claim 1 wherein the first power indicator is a first power-on reset generator and the second power indicator is a second power-on reset generator, each power-on reset generator operable to assert the corresponding power signal a preset time after power is applied to the power-on reset generator.

4. In combination with a backplane operable to form a plurality of electrical connections between cards inserted into the backplane and a receiver card insertable into the backplane, the receiver card comprising a receiver and a power indicator, wherein the receiver has an input connected to the backplane when the receiver card is inserted in the backplane, the receiver operable to receive a signal from the backplane and wherein the power indicator is connected to the backplane when the receiver card is inserted in the backplane, the power indicator operable to assert a power signal through the backplane, the power signal based on power supplied to the receiver card, a transmitter card insertable into the backplane, the transmitter card comprising:
- a switch with a first end, a second end, and a control input, wherein the first end of the switch is connected to a fixed voltage and wherein the control input is connected to the backplane when the transmitter card is inserted in the backplane, the switch closed when an asserted power signal is applied to the control input and the switch open otherwise;
- at least one resistive element having a first end connected to the second end of the switch; and
- a transmitter with an output, the output connected to the backplane when the transmitter card is inserted in the backplane, the output further connected to the second end of the at least one resistive element, wherein the transmitter is enabled if a path exists from the transmitter output to the fixed voltage through the at least one resistive element and is disabled otherwise;
- wherein the transmitter card, backplane, and receiver card form a path between the transmitter and the receiver when the transmitter card and the receiver card are inserted in the backplane; and
- wherein the transmitter card, backplane, and receiver card form a path between the power indicator and the control input when the transmitter card and the receiver card are inserted in the backplane;
- thereby, if the transmitter card is in the backplane, disabling the transmitter if the path between the transmitter and the receiver is broken by hot-swapping the receiver card out of the backplane and enabling the transmitter if the path between the transmitter and the receiver is formed by hot-swapping the receiver card into the backplane.

5. A transmitter card as in claim 4 wherein the transmitter output and the receiver input are a differential pair comprising a first connection and a second connection and wherein the at least one resistive element comprises a first resistor connected between the first connection and the first end of the switch and a second resistor connected between the second connection and the first end of the switch.

6. A transmitter card as in claim 4 wherein the transmitter is a positive power supply emitter-coupled logic (PECL) driver and the fixed voltage is ground.

7. A transmitter card as in claim 4, the power indicator being a power supply bus on the receiver board wherein the asserted power signal is based on the voltage level of a power supply driving the power supply bus.

8. A transmitter card as in claim 4, the power indicator being a power-on reset generator operative to assert a reset output a preset time after power is supplied to the receiver board wherein the asserted power signal is based on the reset output.

9. A transmitter card as in claim 4 further comprising a plurality of transmitters, each transmitter connected through at least one resistive element to the switch.

10. A transmitter card as in claim 4 wherein the switch with a control input is a field effect transistor (FET) having a source, a drain, and a gate, the path between the at least one resistive element and the fixed voltage passing through the source and the drain, and the gate providing the switch control input.

11. In combination with a backplane operable to form a plurality of electrical connections between cards inserted into the backplane and a transmitter card insertable into the backplane, the transmitter card comprising a transmitter and a power indicator, wherein the transmitter has an AC-coupled differential output connected to the backplane when the transmitter card is inserted in the backplane the transmitter operable to transmit a signal to the backplane and wherein the power indicator is connected to the backplane when the receiver card is inserted in the backplane, the power indicator operable to assert a power signal through the backplane, the power signal based on power supplied to the transmitter card, a receiver card insertable into the backplane, the receiver card comprising:
- a receiver with a differential input connected to the backplane when the receiver card is inserted in the backplane wherein the receiver is disabled when the DC level on the differential input is below a threshold and is enabled otherwise;
- a termination network connected to the differential input; and
- a switched biasing network connected to the termination network wherein the switched biasing network has a control input connected to the backplane when the receiver card is inserted in the backplane and wherein the switched biasing network is operable to bias the differential input above the threshold when an asserted power signal is applied to the control input and is operable to bias the differential input below the threshold otherwise;
- wherein the transmitter card, backplane, and receiver card form a path between the transmitter and the receiver when the transmitter card and the receiver card are inserted in the backplane; and
- wherein the transmitter card, backplane, and receiver card form a path between the power indicator and the control input when the transmitter card and the receiver card are inserted in the backplane;
- thereby, if the receiver card is in the backplane, disabling the receiver if the path between the transmitter and the receiver is broken by hot-swapping the transmitter card out of the backplane and enabling the receiver if the path between the transmitter and the receiver is formed by hot-swapping the transmitter card into the backplane.

12. A receiver card as in claim 11 wherein the receiver is a positive power supply emitter-coupled logic (PECL) receiver.

13. A receiver card as in claim 11, the power indicator being a power supply bus on the transmitter board, wherein the asserted power signal is based on the voltage level of a power supply driving the power supply bus.

14. A receiver card as in claim 11, the power indicator being a power-on reset generator operative to assert a reset signal a preset time after power is supplied to the transmitter board, wherein the asserted power signal is based on the reset signal.

15. A receiver card as in claim 11 further comprising a plurality of receivers, each receiver having a termination network, each termination network connected to the switched biasing network.

* * * * *